United States Patent
Nistler et al.

(10) Patent No.: US 8,850,811 B2
(45) Date of Patent: Oct. 7, 2014

(54) SYSTEM AND METHOD FOR DETERMINING COMPRESSION DEVICE DEGRADATION

(75) Inventors: Paul Gerard Nistler, Erie, PA (US); James Robert Mischler, Erie, PA (US); Luke Henry, Erie, PA (US); William Gray, Grove City, PA (US)

(73) Assignee: General Electric Company, Schenectady, NY (US)

(*) Notice: Subject to any disclaimer, the term of this patent is extended or adjusted under 35 U.S.C. 154(b) by 906 days.

(21) Appl. No.: 12/902,183

(22) Filed: Oct. 12, 2010

(65) Prior Publication Data

US 2012/0089314 A1    Apr. 12, 2012

(51) Int. Cl.
| | | |
|---|---|---|
| *F02D 23/00* | (2006.01) | |
| *F02B 33/44* | (2006.01) | |
| *G06F 19/00* | (2011.01) | |
| *B60T 7/12* | (2006.01) | |
| *F02D 41/00* | (2006.01) | |
| *F02D 28/00* | (2006.01) | |
| *F02D 41/22* | (2006.01) | |
| *F02D 41/04* | (2006.01) | |

(52) U.S. Cl.
CPC ........ *F02D 41/22* (2013.01); *F02D 2200/0406* (2013.01); *F02D 41/0007* (2013.01); *F02D 28/00* (2013.01); *Y02T 10/144* (2013.01); *F02D 41/042* (2013.01)
USPC .............. 60/600; 60/601; 60/605.1; 701/102; 701/103

(58) Field of Classification Search
USPC .................. 60/605.1, 600–601; 701/102–103
See application file for complete search history.

(56) References Cited

U.S. PATENT DOCUMENTS

| | | | | |
|---|---|---|---|---|
| 4,196,910 A | * | 4/1980 | Aizu | 277/419 |
| 4,445,336 A | * | 5/1984 | Inoue | 60/605.1 |
| 6,105,555 A | * | 8/2000 | Weber et al. | 123/493 |
| 6,298,718 B1 | * | 10/2001 | Wang | 73/114.01 |
| 6,990,814 B2 | * | 1/2006 | Boley et al. | 60/611 |
| 7,353,102 B2 | * | 4/2008 | Narita et al. | 701/102 |
| 7,469,539 B2 | * | 12/2008 | Squires | 60/605.3 |
| 7,677,227 B2 | * | 3/2010 | Sagisaka et al. | 123/559.1 |
| 8,117,840 B2 | * | 2/2012 | Hara et al. | 60/601 |
| 8,370,047 B2 | * | 2/2013 | Burkhardt et al. | 701/102 |
| 8,701,477 B2 | * | 4/2014 | Malone et al. | 73/114.77 |
| 2006/0288702 A1 | * | 12/2006 | Gokhale et al. | 60/602 |
| 2008/0047525 A1 | * | 2/2008 | Morizane et al. | 123/344 |
| 2008/0053087 A1 | | 3/2008 | Swenson et al. | |
| 2008/0054647 A1 | * | 3/2008 | Kumar | 290/40 R |
| 2009/0055072 A1 | * | 2/2009 | He et al. | 701/102 |
| 2010/0023369 A1 | * | 1/2010 | Chapman et al. | 705/9 |
| 2010/0204899 A1 | * | 8/2010 | Serres | 701/103 |

* cited by examiner

*Primary Examiner* — Thomas Denion
*Assistant Examiner* — Ngoc T Nguyen

(57) ABSTRACT

Systems and methods for determining compression device degradation of an engine of a rail vehicle are provided. In one embodiment, a rail vehicle system includes an engine, an air-intake passage coupled to the engine, a compression device including a compressor positioned along the air-intake passage, a barometric air pressure sensor for measuring a barometric air pressure upstream of the compressor, a manifold air pressure sensor for measuring a manifold air pressure downstream of the compressor, and a controller configured to adjust a rail vehicle operating parameter responsive to a determination of compression device degradation based on a negative pressure differential between the manifold air pressure and the barometric air pressure during a designated operating condition.

23 Claims, 3 Drawing Sheets

SYSTEM AND METHOD FOR DETERMINING COMPRESSION DEVICE DEGRADATION

FIELD

The subject matter disclosed herein relates to determining if a compression device of an engine of a vehicle has degraded.

BACKGROUND

A compression device, such as a compressor of a turbocharger, is implemented with an internal combustion engine to compress intake air, and thereby increase air charge density entering cylinders of the engine. The increased air charge density enables power generated from combustion in the engine cylinders to be increased, while maintaining acceptable air-fuel ratio limits and other operating parameters to reduce emissions.

However, compression device degradation creates various issues that affect engine operation. For example, if a turbocharger fails and stops spinning due to bearing seizure, oil fed to a turbocharger bearing leaks into an intake manifold of the engine. As the engine continues to operate, the oil accumulating in the intake manifold seeps into cylinders of the engine. The introduction of engine oil into the cylinders causes undesired combustion or dieseling. This dieseling, once started, continues until the engine runs out of oil, which may result in engine degradation including total engine failure.

BRIEF DESCRIPTION OF THE INVENTION

Accordingly, to address the above issues, various embodiments of systems and methods for determining compression device degradation and operating a rail vehicle based on compression device degradation are described herein. For example, in one embodiment, a rail-vehicle system comprises an engine, an air-intake passage coupled to the engine, a compression device including a compressor positioned along the air-intake passage, a barometric air pressure sensor for measuring a barometric air pressure upstream of the compressor, a manifold air pressure sensor for measuring a manifold air pressure downstream of the compressor, and a controller configured to adjust a rail vehicle operating parameter responsive to a determination of compression device degradation based on a negative pressure differential between the manifold air pressure and the barometric air pressure during a designated operating condition.

The existence of a negative pressure differential between manifold air pressure and barometric air pressure (i.e., intake manifold vacuum), particularly during designated operating conditions, such as during selected speed or load windows, provides an accurate and robust indication that the compressor has stopped due to degradation and is reducing air flow in the intake manifold. By determining compression device degradation particularly during the designated conditions (e.g., only during those conditions, and not others), rail vehicle operation can be adjusted to reduce the likelihood of additional component degradation or failure. For example, the engine can be shutdown before enough oil has accumulated to diesel, and fail, the engine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
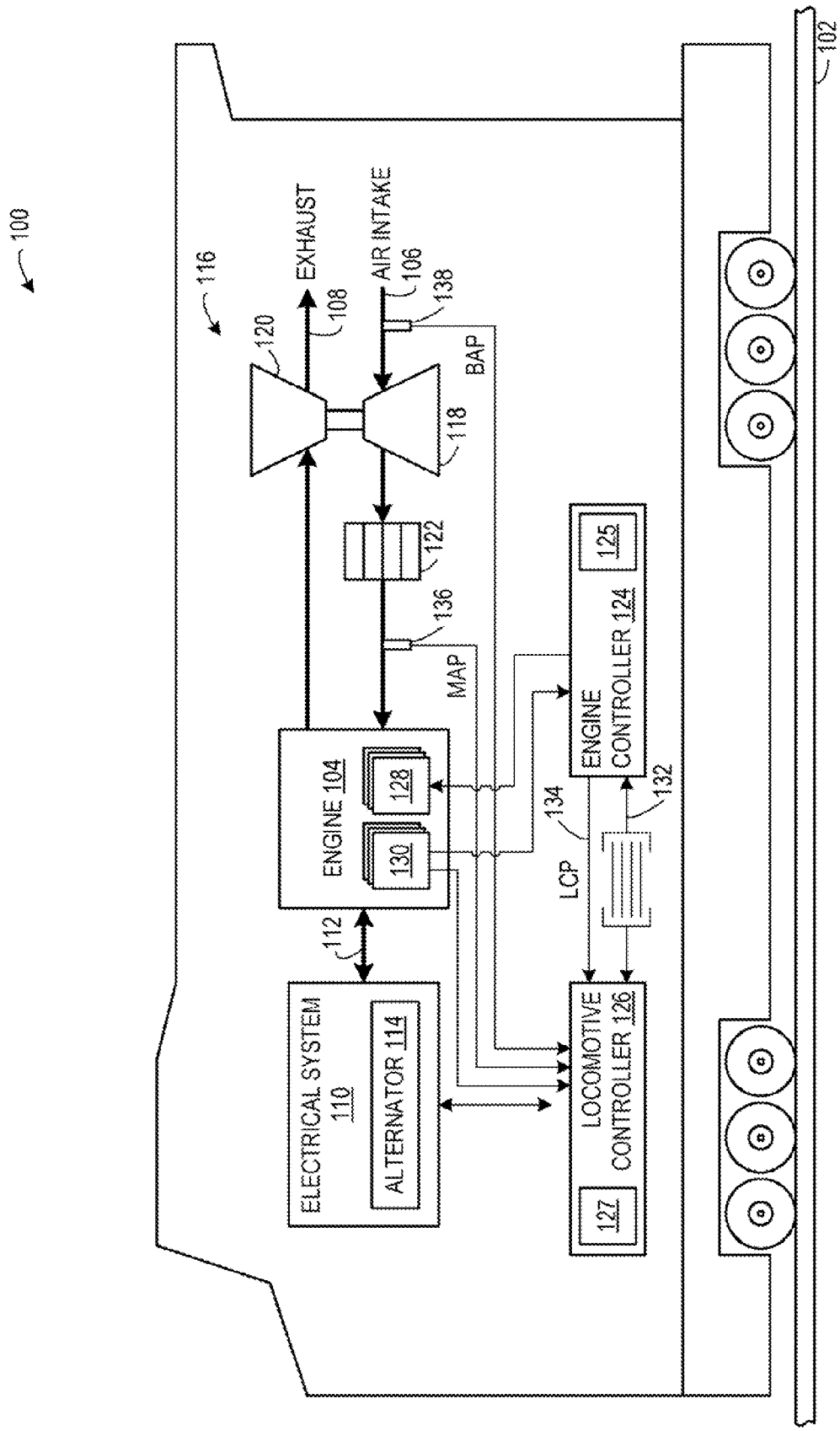
FIG. 1 is schematic diagram of an example embodiment of a rail vehicle of the present disclosure.

A stationary power plant, ship, off-highway vehicle, rail vehicle (such as a locomotive) or other such systems include a forced-induction internal combustion engine that receives air from a compression device, such as a turbocharger. An example embodiment of a rail vehicle, as illustrated in FIG. 1, includes a controller to monitor and control operation of various components of the rail vehicle. For example, the controller is configured to monitor performance of a compression device, determine if the compression device has degraded based on the performance, and adjust operation based on the determination of compression device degradation.

Figure 2:
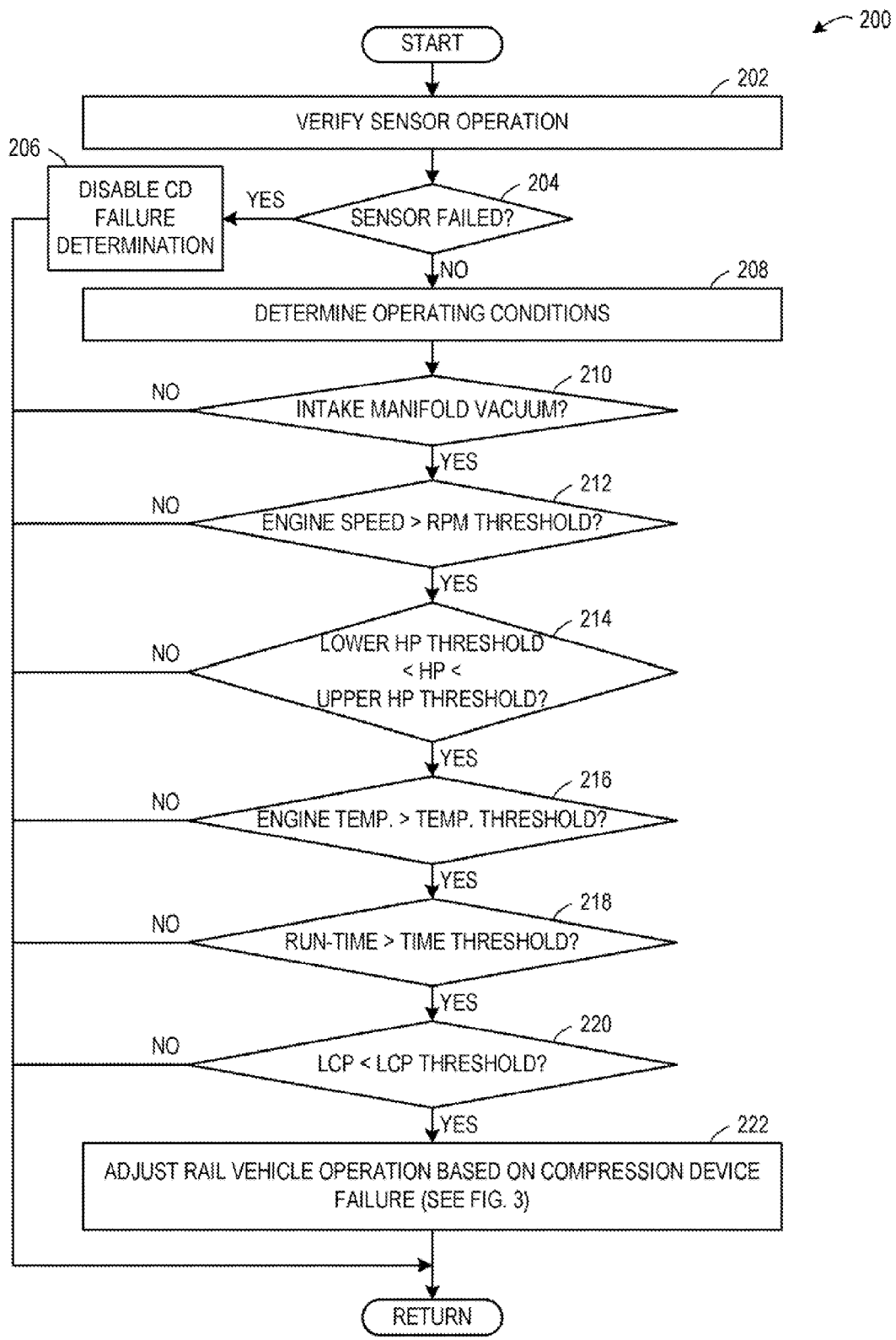
FIG. 2 is flow diagram of an example embodiment of a method for determining degradation of a compression device of an engine of a rail vehicle of the present disclosure.

FIG. 2 shows an example embodiment of a method for determining if a compression device of an engine has degraded based on different operating conditions. As an example, a determination of compression device degradation is based on a pressure difference across a compressor of the compression device during one or more designated operating conditions, such as when vacuum is present in the intake manifold and the engine is operating in a selected speed and horsepower window. The method enables compression device degradation to be accurately determined for a variety of system configurations. For example, the method is particularly applicable to rail vehicle configurations that do not include a compression device speed sensor to indicate if a compression device has seized or degraded, in that the method may be independent of measurement of compressor speed.

Figure 3:
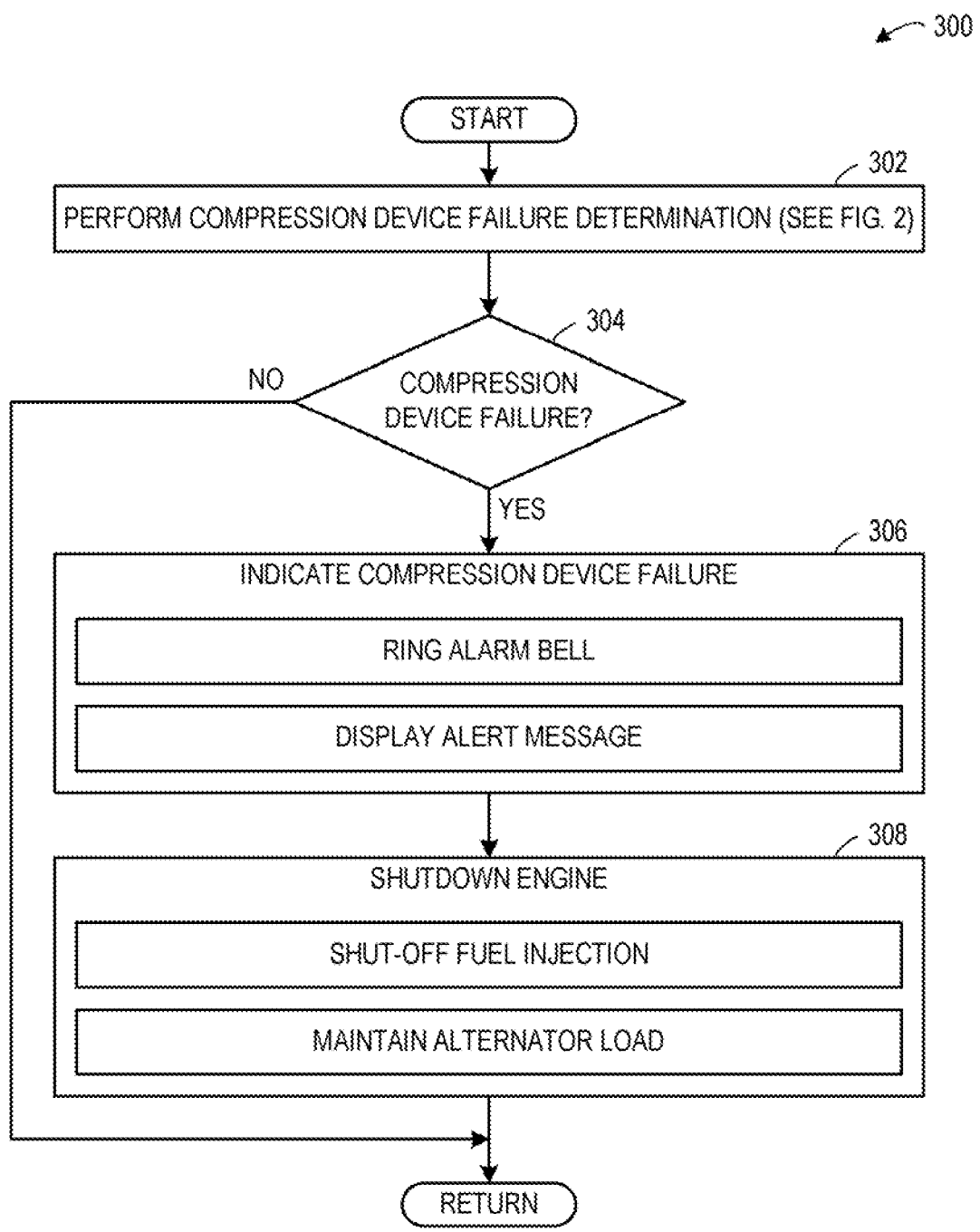
FIG. 3 is a flow diagram of an example embodiment of a method for controlling a rail vehicle based on a determination of compression device degradation.

FIG. 3 shows an example embodiment of a method for operating a vehicle, such as a rail vehicle, based on a determination of compression device degradation. As an example, the engine of the rail vehicle is shutdown according to a designated procedure responsive to determination of compression device degradation. In this way, the likelihood of engine degradation due to compression device degradation can be reduced.

FIG. 1 is a block diagram of an example embodiment of a vehicle or vehicle system, herein depicted as a rail vehicle 100, configured to run on a rail 102. While illustrated in the context of a rail vehicle, the various approaches described herein can be applied to other engine configurations, such as an engine in a stationary power plant, an engine of a ship, and an engine of an off-highway vehicle, The rail vehicle 100 includes an engine 104. The engine 104 receives intake air for combustion from an air-intake passage 106. The air-intake passage 106 receives ambient air from an air filter (not shown) that filters air from outside of the rail vehicle 100. Exhaust gas resulting from combustion in the engine 104 is supplied to an exhaust passage 108. Exhaust gas flows through the exhaust passage 108 and is exhausted from the rail vehicle 100. In one example, the engine 104 is a sixteen cylinder, diesel engine that combusts air and diesel fuel through compression ignition. In other non-limiting embodiments, the engine 104 may combust fuel including gasoline, kerosene, biodiesel, or other petroleum distillates of similar density through compression ignition (or spark ignition).

A compression device 116, such as a turbocharger or a supercharger including at least a compressor 118, is arranged along the air-intake passage 106 to compress intake air for combustion in the engine 104. For a turbocharger, the compressor 118 is at least partially driven by a turbine 120 (e.g., through a shaft) that is arranged along the exhaust passage 108. The turbine 120 spools up to drive the compressor 118 based on a flow of exhaust gas in the exhaust passage 108. For a supercharger, the compressor 118 is at least partially driven by the engine and/or an electric machine, and does not include a turbine.

In one example, the rail vehicle 100 does not include a throttle valve positioned in the air-intake passage 106, and intake air flow to the compressor 118 is not varied by throttling, although a throttle may be utilized if desired. In one example, the rail vehicle 100 does not include an exhaust gas recirculation line that directs exhaust gas from the exhaust passage 108 back to the air-intake passage for combustion in cylinders of the engine 104, although exhaust gas recirculation may be utilized if desired.

An intercooler 122 is positioned downstream of the compressor 118 in the air-intake passage 106, between the engine 104 and the compression device 116. The intercooler 122 cools air charge compressed by the compressor 118 to enable increased cylinder charge density for combustion by the engine 104.

In some embodiments, the engine 104 includes a guillotine valve that is actuatable to inhibit fluid from entering the engine 104. As discussed above, upon compression device degradation, engine oil can leak from the seized bearing into the intake manifold of the engine. By actuating the guillotine valve in response to a determination of compression device degradation, oil is inhibited from entering the engine and engine shutdown is facilitated.

In one example, the rail vehicle 100 is a diesel-electric vehicle. For example, the engine 104 is a diesel engine that generates a torque output that is transmitted to an electrical system 110 along a drive shaft 112. The torque generated by the engine 104 is converted to electricity by an alternator 114 of the electrical system 110 for subsequent propagation to a variety of downstream electrical components. For example, the alternator 114 provides electrical power to a plurality of traction motors (not shown) to provide tractive power to propel the rail vehicle 100.

An engine controller 124 controls various components related to operation of the engine 104. In one example, the engine controller 124 includes a computer control system. The controller 124 further includes computer readable storage medium 125 including non-transitory code for enabling on-board monitoring and control of rail vehicle operation including code for carrying out control methods such as the method illustrated in FIGS. 2 and 3. The engine controller 124, while overseeing control and management of the engine 104, is configured to receive signals from a variety of sensors, including engine sensors 130, as further elaborated herein, in order to determine operating parameters and operating conditions. Example engine sensors 130 include, but are not limited to, one or more of an engine coolant temperature sensor, an engine oil temperature sensor, an engine speed sensor (e.g., a PIP signal from a Hall Effect sensor), a manifold pressure sensor, an oxygen sensor, a barometric air pressure sensor, etc. Correspondingly, the engine controller 124 adjusts various engine actuators 128 to control operation of the engine 104. Example engine actuators 128 include, but are not limited to, one or more of cylinder valve timing and/or lift mechanisms, fuel injectors, alternator, etc.

In some embodiments, the rail vehicle 100 does not include a compression device speed sensor. In some embodiments, the rail vehicle 100 does not include a mass air flow sensor. For example, some legacy rail vehicles may not include one or both of these sensors.

A locomotive controller 126 controls various components related to operation of the rail vehicle 100. For example, the locomotive controller 126 controls operation of the electrical system 110 to distribute electrical power to components, such as traction motors (not shown) to propel the rail vehicle 100. As another example, the locomotive controller 126 controls operation of brakes (not shown) to slow the rail vehicle 100. As yet another example, the locomotive controller 126 controls components relating to communication and position coordination of the rail vehicle 100, such as way-side communication, track position (e.g., positive train control), or the like.

The locomotive controller 126, while overseeing control and management of the rail vehicle 100, is configured to receive signals from a variety of sensors, as further elaborated herein, in order to determine operating parameters and operating conditions of the rail vehicle 100. For example, the locomotive controller 126 oversees operation of the electrical system 110 and receives signals indicating operation of the electrical system 110. For example, the locomotive controller 126 receives signals indicating a torque load of the alternator 114, power output (e.g., horsepower) from the engine 104, and the like. As another example, the locomotive controller 126 oversees operation of the engine 104 and receives signals from engine sensors 130.

Furthermore, as discussed above, the locomotive controller 126 monitors operating conditions to determine if the compression device 116 has degraded. To monitor operating conditions related to the compression device 116, the locomotive controller 126 receives a barometric air pressure (BAP) signal from a barometric air pressure sensor 138 that is positioned upstream of the compressor 118 of the compression device 116. In one example, the barometric air pressure sensor 138 is positioned upstream of the compressor 118 in the intake manifold 106. In one example, the barometric air pressure sensor 138 is positioned upstream of the compressor 118 positioned external to the rail vehicle 100. In one example, the barometric air pressure sensor 138 is positioned upstream of the compressor 118 positioned at another location in the rail vehicle 100. Also, the locomotive controller 126 receives a manifold air pressure (MAP) signal from a manifold air pressure sensor 136 positioned downstream of the compressor 118 of the compression device 116. In some embodiments, one or more of the BAP sensor 138 and the MAP sensor 136 are absolute pressure sensors. In some embodiments, one or more of the BAP sensor 138 and the MAP sensor 136 are gage pressure sensors.

The locomotive controller 126 is configured to compare a pressure differential between the MAP and BAP signals to determine if there is a vacuum or negative pressure differential across the compressor 118. The negative pressure differential indicates that air flow into the manifold is blocked by the compressor, since a properly functioning compression device typically increases manifold pressure relative to ambient pressure during operation, except under certain conditions that are accounted for by the locomotive controller 126. Determination of compression device degradation will be discussed in further detail below with reference to FIGS. 2 and 3.

In one example, sensors that send signals to the locomotive controller 126 are independent of sensors that send signal to the engine controller 124. For example, the manifold air pressure sensor 136 is independent of a manifold air pressure sensor that sends signals to the engine controller 124. The redundancy in sensors enables more robust monitoring and control of the rail vehicle 100.

The locomotive controller 126 coordinates operation and control with the engine controller 124 through communication line 132. In one example, the communication line 132 includes four different control lines that the locomotive controller 126 uses to send control signals to the engine controller 124. Furthermore, the engine controller 124 sends signals indicating various operating parameters to the locomotive controller 126. For example, a load control potentiometer (LCP) signal that indicates a measurement of engine deration is sent from the engine controller 124 to the locomotive controller 126. The LCP signal indicates an amount of torque output the engine 104 can produce relative to a torque load of the alternator 114. For example, a LCP signal of 100% indicates that the engine 104 can produce enough torque output to meet the torque load of the alternator 114. The locomotive controller 126 uses the LCP signal as part of the determination of compression device degradation as will be discussed in further detail below. Note, in some embodiments, the locomotive controller 126 determines an LCP value based on an air/fuel signal received from the engine controller 124.

In one example, the locomotive controller 126 includes a computer control system. Furthermore, the locomotive controller 126 further includes computer readable storage medium 127 including non-transitory code for enabling on-board monitoring and control of rail vehicle operation including code for carrying out control methods such as the method illustrated in FIGS. 2 and 3. In some embodiments, functionality of the locomotive controller 126 and the engine controller 124 are combined in a single controller to oversee and control operation of the rail vehicle 100.

The configuration illustrated above enables various methods for controlling a rail vehicle to determine degradation of the compression device 116. Accordingly, some such methods are now described, by way of example, with continued reference to the above configurations. It will be understood, however, that these methods, and others fully within the scope of the present disclosure, may be enabled by other configurations as well.

FIG. 2 is an example embodiment of a method 200 for determining degradation of a compression device of an engine of a rail vehicle. In one example, the locomotive controller 126 of FIG. 1 is configured to perform the method 200. Although, it will be appreciated that the method may be applicable to virtually all electronically controlled turbocharged engines.

At 202, the method includes verifying sensor operation. Verifying sensor operation includes verifying that the sensors are taking accurate measurements. Furthermore, verifying sensor operation includes determining if the correct sensors have been installed on the rail vehicle. In one example, sensor verification is performed by checking the pressure difference between the MAP signal from the sensor 136 and the BAP signal from the sensor 138 when the engine 104 is shut-off or idling (e.g., operating under 440 RPM with no load).

At 204, the method includes determining if one or more of the sensors have degraded or the wrong sensors are installed. In one example, it is determined that one or more of the sensors have degraded when the pressure difference between the signals at engine shut-off or idle is less than a threshold (e.g., −5 psi). If it is determined that one or more of the sensors have degraded or that the wrong sensors are installed, the method moves to 206. Otherwise, the method moves to 208.

At 206, the method includes disabling the compression device degradation determination routine. The determination of compression device degradation is suspended until sensor operation is verified as being correct and/or correct sensors are installed. In one example, disabling the compression device degradation determination routine includes using default MAP values in place of a sensed MAP signal.

At 208, the method includes determining operating conditions of the rail vehicle. Determining operating conditions includes receiving signals from sensors of the rail vehicle. Example sensor signals that are received include, but are not limited to, MAP, BAP, engine speed, horsepower, LCP, engine coolant water temperature, engine oil temperature, engine air/fuel ratio, electrical power load, engine run-time, etc. Furthermore, determining operating conditions includes determining a state of actuators of the rail vehicle.

At 210, the method includes determining if a vacuum exists in the intake manifold. The determination is made by subtracting the ambient pressure (BAP) from the pressure inside the intake manifold (MAP) downstream of the compressor 118. In some embodiments, the determination is made based on a pressure differential being greater than a predetermined pressure differential threshold. In one example, if the differential pressure is less than a negative pressure threshold (e.g., −1 pounds per square inch) for a duration longer than a time threshold (e.g., 5 seconds) then it is determined that a vacuum exists in the intake manifold. If it is determined that a vacuum exists in the intake manifold, the method moves to 212. Otherwise, the method returns to other operations.

If the pressure difference between the MAP signal and the BAP signal is sufficiently negative (indicating a vacuum exists in the manifold), the compressor 118 of the compression device 116 is hindering air flow into the intake manifold which may indicate a degraded or damaged compression device. To increase confidence in the initial determination and reduce the likelihood of a false positive determination of degradation, the method includes determining if the rail vehicle is operating under conditions where the pressure difference is indicative of a degraded compression device.

In embodiments where the compression device is a turbocharger, at 212, the method includes determining if the engine speed is greater than an engine speed threshold. The engine speed threshold is a speed at which the engine would normally spool up the turbocharger and/or would provide a strongly degraded pressure differential across the compressor. In one example, the engine speed threshold is set at eight hundred and fifty revolutions per minute. If the engine speed is less than the engine speed threshold, a negative pressure may be a suitable state of the engine, and an indication of turbocharger degradation could be inaccurate. The engine speed condition of the compression device degradation routine provides a differentiation between a stopped/seized compressor and a free spinning compressor. If it is determined that the engine speed is greater than the engine speed threshold, then the method moves to 214. Otherwise, the method returns to other operations.

At 214, the method includes determining if an engine horsepower output is greater than a lower horsepower threshold and less than an upper horsepower threshold. In one example, the engine horsepower is determined from voltage and amperage signals received from the electrical system 110 that indicate the horsepower produced by the engine that is applied to the alternator 114. In another example, the engine horsepower is determined based on a fuel injection amount, MAP, and RPM signals. In one example, the upper horsepower threshold is set to a horsepower that an engine with a degraded turbocharger would not attain for the particular engine speed. Furthermore, the lower horsepower threshold is set to a minimum horsepower to spool up the turbo. The horsepower condition of the compression device degradation determination routine provides an additional check for false pressure sensor readings and reduces the likelihood of a false positive or nuisance fault. If it is determined that the engine horsepower is greater than a lower horsepower threshold and less than an upper horsepower threshold, then the method moves to 216. Otherwise, the method returns to other operations.

At 216, the method includes determining if the engine temperature is greater than a temperature threshold. As an example, the engine temperature is determined from an engine oil temperature. As another example, the engine temperature is determined from an engine coolant water temperature. The engine oil temperature and/or engine coolant water temperature are checked to ensure that the engine is not in a transient (i.e. warm-up) condition. Specifically, during the warm-up condition, the engine oil temperature is sufficiently low so that the viscosity of the engine oil in the turbocharger bearings may hinder the compressor from spinning freely, which could result in a negative pressure difference. The water temperature is added to improve robustness of the conditions. The engine temperature condition of the compression device degradation determination routine provides an additional check if a vacuum exists in the intake manifold to reduce the likelihood of a false positive or nuisance fault. If it is determined that the engine temperature is greater than a temperature threshold, then the method moves to 218. Otherwise, the method returns to other operations.

At 218, the method includes determining if an engine run time is greater than a time threshold. In one example, the time threshold is a duration it takes for the engine to warm up or become stable (i.e., not transient). If the engine just started, it may not be operating in a fully operational state where the compression device is spinning. The engine run-time condition of the compression device degradation determination routine provides an additional check if a vacuum exists in the intake manifold to reduce the likelihood of a false positive or nuisance fault. If it is determined that the engine run time is greater than the time threshold, then the method moves to 220. Otherwise, the method returns to other operations.

At 220, the method includes determining if a load control potentiometer (LCP) value is less than a LCP threshold. If the LCP is not at 100%, the engine power is being de-rated. Engine de-ration indicates that the air/fuel ratio of the engine is restricted which indicates that manifold air flow is being restricted by a seized turbocharger. In one example where the locomotive controller 126 and the engine controller 124 receive independent MAP signals from different pressure sensors, the LCP signal provides an indirect confirmation of the MAP reading, since the LCP value is determined using a MAP signal that is independent of the MAP signal used to determine that vacuum exists in the intake manifold. The LCP condition makes the compression device degradation determination more robust and reduces the likelihood of false positives or nuisance faults. If it is determined that the LCP is less than the LCP threshold, then the method moves to 222. Otherwise, the method returns to other operations.

In one example, once the locomotive system 126 has verified that the engine 104 is in a non-transient condition (e.g., not in a condition that conflicts with a determination of manifold vacuum due to compression device degradation), and the pressure difference across the compressor 118 is sufficiently negative, both sets of parameters (engine condition and pressure) are monitored for a predetermined set of samples to build confidence that determination of compression device degradation is correct.

At 222, the method includes adjusting rail vehicle operation based on a determination that the compression device has degraded. The adjustment in rail vehicle operation will be discussed in further detail with reference to FIG. 3.

The above described method determines if a compression device (e.g., turbocharger) on an engine of a rail vehicle has degraded/seized by monitoring the pressure difference across the compressor for intake manifold vacuum. Once it is determined that intake manifold vacuum exists, different engine conditions are checked to reduce the likelihood of a false positive determination of compression device degradation. In this way, compression device degradation can be determined in an accurate and robust manner.

Furthermore, the method is applicable to virtually all electronically controlled turbocharged engines. Whereas, other compression device degradation variants require additional sensors monitoring parameters such as turbocharger speed or mass air flow.

FIG. 3 is an example embodiment of a method 300 for controlling a rail vehicle based on a determination of compression device degradation. In one example, the locomotive controller 126 of FIG. 1 is configured to perform the method 300. Although, it will be appreciated that the method may be applicable to virtually all rail vehicles that include electrically controlled turbocharged engines.

At 302, the method includes performing the compression device degradation determination routine shown in FIG. 2 to determine if a compression device has degraded.

At 304, the method includes determining if the compression device has degraded. If it is determined that the compression device has degraded, then the method continues to 306. Otherwise, the method returns to other operations.

At 306, the method includes indicating compression device degradation. In one example, indicating compression device degradation includes ringing an alarm bell to alert an operator of the degradation. In another example, indicating compression device degradation includes displaying an alert message such as "SHUTDOWN: Turbo Problem Detected" on a display of an operator control device.

At 308, the method includes shutting down the engine. In one example, shutting down the engine includes sending engine shutdown commands from the locomotive controller 126 to the engine controller 124. In another example, shutting down the engine includes shutting-off fuel injection to the engine. In another example, shutting down the engine includes maintaining an alternator load on the engine. In yet another example, shutting down the engine includes actuating a guillotine valve to close off the combustion chamber from fluid in order to inhibit combustion.

The above method enables detection of a degraded compression device and corresponding engine shutdown. By shutting down the engine quickly upon compression device degradation, dieseling of the engine due to oil leaked from the degraded compression device can be inhibited. In this way, the likelihood of engine degradation can be reduced.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling a vehicle including an engine, an air-intake passage coupled to the engine, and a compression device including a compressor positioned along the air-intake passage, the method comprising:
adjusting a vehicle operating parameter responsive to a predetermined pressure differential between a manifold air pressure downstream of the compressor and a barometric air pressure upstream of the compressor, during a designated operating condition including one or more of an engine speed being greater than an engine speed threshold, an engine horsepower being greater than a horsepower threshold set to a horsepower to spool up the compression device, an engine temperature being greater than a temperature threshold, an engine run time being greater than a time threshold, and an engine de-ration level being less than an engine de-ration threshold.

2. The method of claim 1, wherein the designated operating condition includes an engine speed being greater than an engine speed threshold.

3. The method of claim 1, wherein the designated operating condition includes an engine horsepower being greater than a horsepower threshold set to a horsepower to spool up the compression device.

4. The method of claim 1, wherein the designated operating condition includes an engine temperature being greater than a temperature threshold.

5. The method of claim 1, wherein the designated operating condition includes an engine run time being greater than a time threshold.

6. The method of claim 1, wherein the designated operating condition includes an engine de-ration level being less than an engine de-ration threshold.

7. The method of claim 1, wherein the vehicle further includes an alternator coupled to the engine, and wherein adjusting the vehicle operating parameter includes maintaining an alternator load on the engine to stop the engine, alerting a vehicle operator of compression device degradation, shutting-off fuel injection to the engine, and actuating a guillotine valve to inhibit fluid from entering a combustion chamber of the engine.

8. A method for controlling a vehicle including an engine, an air-intake passage coupled to the engine, a compression device including a compressor positioned along the air-intake passage, and an alternator coupled to the engine, the method comprising:
adjusting a vehicle operating parameter responsive to a predetermined pressure differential between a manifold air pressure downstream of the compressor and a barometric air pressure upstream of the compressor, during a designated operating condition, wherein adjusting the vehicle operating parameter includes maintaining an alternator load on the engine to stop the engine, alerting a vehicle operator of compression device degradation, shutting-off fuel injection to the engine, and actuating a guillotine valve to inhibit fluid from entering a combustion chamber of the engine.

9. An engine system comprising:
an engine;
an air-intake passage coupled to the engine;
a compression device including a compressor positioned along the air-intake passage;
a barometric air pressure sensor for measuring a barometric air pressure upstream of the compressor;
a manifold air pressure sensor for measuring a manifold air pressure downstream of the compressor; and
a controller configured to adjust an operating parameter responsive to a determination of compression device degradation based on a predetermined pressure differential between the manifold air pressure and the barometric air pressure during a designated operating condition, wherein the engine system does not include a throttle valve to throttle air in the air-intake passage.

10. An engine system comprising:
an engine;
an air-intake passage coupled to the engine;
a compression device including a compressor positioned along the air-intake passage;
a barometric air pressure sensor for measuring a barometric air pressure upstream of the compressor;
a manifold air pressure sensor for measuring a manifold air pressure downstream of the compressor; and
a controller configured to adjust an operating parameter responsive to a determination of compression device degradation based on a predetermined pressure differential between the manifold air pressure and the barometric air pressure during a designated operating condition, wherein the engine system does not include a compression device speed sensor and the determination of compression device degradation is determined independent of a compression device speed measurement.

11. An engine system comprising:
an engine;
an air-intake passage coupled to the engine;
a compression device including a compressor positioned along the air-intake passage;
a barometric air pressure sensor for measuring a barometric air pressure upstream of the compressor;
a manifold air pressure sensor for measuring a manifold air pressure downstream of the compressor; and
a controller configured to adjust an operating parameter responsive to a determination of compression device degradation based on a predetermined pressure differential between the manifold air pressure and the barometric air pressure during a designated operating condition including one or more of an engine speed being greater than an engine speed threshold, an engine horsepower being greater than a horsepower threshold set to a horsepower to spool up the compression device, an engine temperature being greater than a temperature threshold, and an engine de-ration level being greater than an engine de-ration threshold.

12. The system of claim 11, wherein the designated operating condition includes an engine speed being greater than an engine speed threshold.

13. The system of claim 11, wherein the designated operating condition includes an engine horsepower being greater than a horsepower threshold set to a horsepower to spool up the compression device.

14. The system of claim 11, wherein the designated operating condition includes an engine temperature being greater than a temperature threshold.

15. The system of claim 11, wherein the designated operating condition includes an engine run time being greater than a time threshold.

16. The system of claim 11, wherein the designated operating condition includes an engine de-ration level being greater than an engine de-ration threshold.

17. The system of claim 11, wherein adjusting the operating parameter includes alerting a vehicle operator of compression device degradation and shutting-off fuel injection to the engine.

18. The system of claim 11, further comprising:

an alternator coupled to the engine, and wherein adjusting the operating parameter includes maintaining an alternator load on the engine to stop the engine.

19. The system of claim 11, wherein the engine system does not include a compression device speed sensor and the determination of compression device degradation is determined independent of a compression device speed measurement.

20. The system of claim 11, wherein the engine system does not include a mass air flow sensor and the determination of compression device degradation is determined independent of a mass air flow measurement.

21. The system of claim 11, wherein the engine system does not include a throttle valve to throttle air in the air-intake passage.

22. A rail vehicle system comprising:
an engine;
an air-intake passage coupled to the engine;
a compression device including a compressor positioned along the air-intake passage;
a barometric air pressure sensor for measuring a barometric air pressure upstream of the compressor;
a manifold air pressure sensor for measuring a manifold air pressure downstream of the compressor; and
a controller configured to adjust a rail vehicle operating parameter responsive to a determination of compression device degradation based on a negative pressure differential between the manifold air pressure and the barometric air pressure during an operating condition where each of the following is true: an engine speed is greater than an engine speed threshold, an engine horsepower is greater than a horsepower threshold, an engine temperature is greater than a temperature threshold, an engine run time is greater than a time threshold, and an engine de-ration level is less than an engine de-ration threshold.

23. The system of claim 22, further comprising:
an alternator coupled to the engine; and
adjusting the rail vehicle operating parameter includes alerting a vehicle operator of compression device degradation, shutting-off fuel injection to the engine, actuating a guillotine valve to inhibit fluid from entering a combustion chamber of the engine, and/or maintaining an alternator load on the engine to stop the engine.

* * * * *